(12) United States Patent
Matsuoka

(10) Patent No.: US 9,456,126 B2
(45) Date of Patent: Sep. 27, 2016

(54) IMAGE PICKUP APPARATUS, CONTROL APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Masaaki Matsuoka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/745,791

(22) Filed: Jun. 22, 2015

(65) Prior Publication Data

US 2015/0373254 A1 Dec. 24, 2015

(30) Foreign Application Priority Data

Jun. 24, 2014 (JP) .................................. 2014-129161

(51) Int. Cl.
*H04N 5/232* (2006.01)
(52) U.S. Cl.
CPC ................................ *H04N 5/23212* (2013.01)

(58) Field of Classification Search
CPC .................................................. H04N 5/23212
USPC ............................................................ 348/349
See application file for complete search history.

(56) References Cited

FOREIGN PATENT DOCUMENTS

| JP | 07-318793 A | 12/1995 |
| JP | 2008-015754 A | 1/2008 |
| JP | 2013-161065 A | 8/2013 |
| JP | 2013-235047 A | 11/2013 |

*Primary Examiner* — Usman Khan
(74) *Attorney, Agent, or Firm* — Cowan, Liebowitz & Latman, P.C.

(57) ABSTRACT

An image pickup apparatus includes an image pickup unit configured to receive an incident light beam from regions of a pupil of an optical system different from each other to output a first image signal and a second image signal, and a calculation unit configured to calculate an evaluation value while relatively shifting the first and second image signals from pixels included in a predetermined range to calculate a defocus amount, and the calculation unit is configured to change a size of the predetermined range so that a center of a visual field range relative to a position of a target pixel does not vary depending on a shift amount between the first and second image signals.

13 Claims, 12 Drawing Sheets

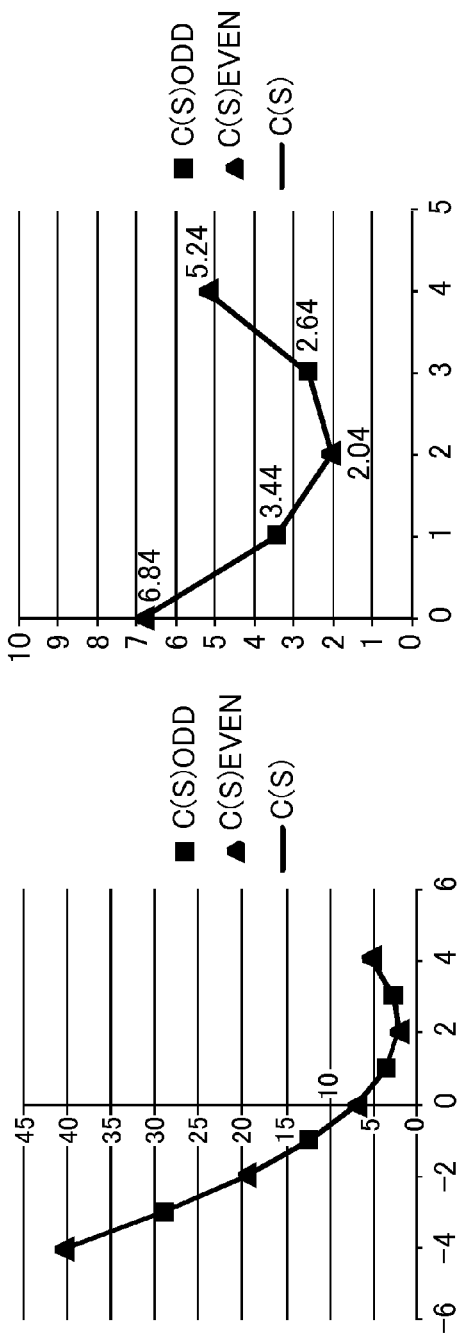
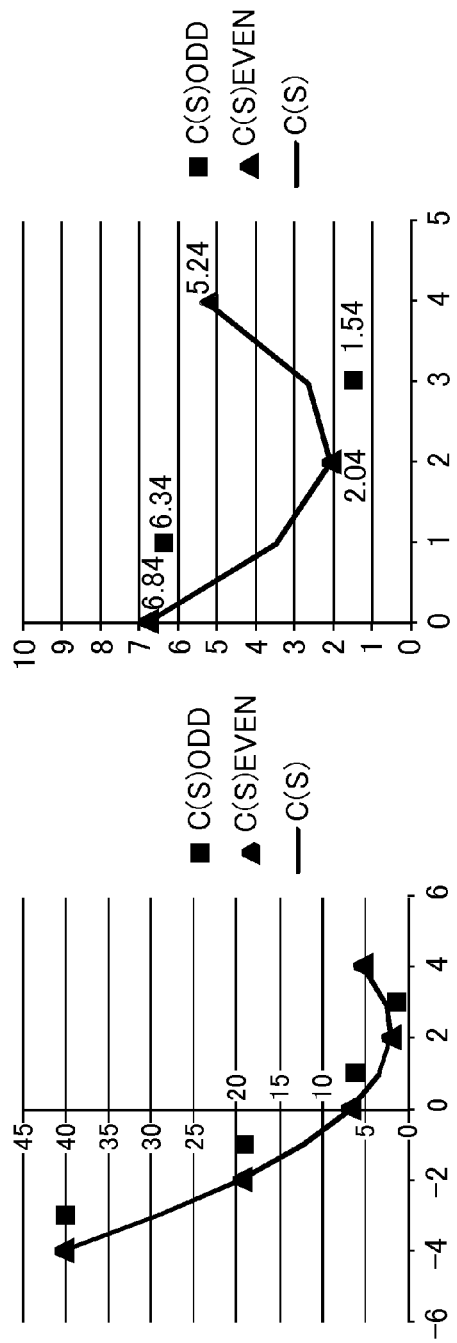

IMAGE PICKUP APPARATUS, CONTROL APPARATUS, CONTROL METHOD, AND NON-TRANSITORY COMPUTER-READABLE STORAGE MEDIUM

BACKGROUND OF THE INVENTION

1. Field of the Invention

The present invention relates to an image pickup apparatus which calculates a defocus amount by a phase difference detection method using an image pickup element.

2. Description of the Related Art

Previously, an image pickup apparatus which calculates a defocus amount (difference between a light receiving plane and an imaging plane formed by a lens) by a phase difference detection method (pupil-divided phase difference detection method) using an image pickup element has been known.

Japanese Patent Laid-open No. H07-318793 discloses a method of using an a-sensor array and a b-sensor array which receive incident light beams from different regions in a pupil of an image pickup optical system to obtain a correlation function while relatively shifting object images formed on the a-sensor array and the b-sensor array. Japanese Patent Laid-open No. 2008-15754 discloses a method of obtaining a shift amount to give a minimum value for continuous correlation amounts by using a method of three-point interpolation.

However, in the method disclosed in Japanese patent Laid-open NO. 2008-15754, a correct defocus amount cannot be calculated, depending on the object image (particularly, for three-dimensional object image), by using the method of three-point interpolation in some cases.

SUMMARY OF THE INVENTION

The present invention provides an image pickup apparatus, a control apparatus, a control method, and a non-transitory computer-readable storage medium which are capable of calculating a highly-accurate defocus amount regardless of an object image when performing focus detection by a pupil-divided phase difference detection method.

An image pickup apparatus as one aspect of the present invention includes an image pickup unit configured to receive an incident light beam from regions of a pupil of an optical system different from each other to output a first image signal and a second image signal, and a calculation unit configured to calculate an evaluation value while relatively shifting the first and second image signals from pixels included in a predetermined range to calculate a defocus amount, and the calculation unit is configured to change a size of the predetermined range so that a center of a visual field range relative to a position of a target pixel does not vary depending on a shift amount between the first and second image signals.

A control apparatus as another aspect of the present invention includes an input unit configured to input a first image signal and a second image signal output from an image pickup unit based on an incident light beam from regions of a pupil of an optical system different from each other, and a calculation unit configured to calculate an evaluation value while relatively shifting the first and second image signals from pixels included in a predetermined range to calculate a defocus amount, and the calculation unit is configured to change a size of the predetermined range so that a center of a visual field range relative to a position of a target pixel does not vary depending on a shift amount between the first and second image signals.

A control method as another aspect of the present invention includes the steps of acquiring a first image signal and a second image signal output from an image pickup unit based on an incident light beam from regions of a pupil of an optical system different from each other, and calculating an evaluation value while relatively shifting the first and second image signals from pixels included in a predetermined range to calculate a defocus amount, and the step of calculating the evaluation value includes changing a size of the predetermined range so that a center of a visual field range relative to a position of a target pixel does not vary depending on a shift amount between the first and second image signals.

A non-transitory computer-readable storage medium as another aspect of the present invention stores a program causing a computer to execute a process including the steps of acquiring a first image signal and a second image signal output from an image pickup unit based on an incident light beam from regions of a pupil of an optical system different from each other, and calculating an evaluation value while relatively shifting the first and second image signals from pixels included in a predetermined range to calculate a defocus amount, and the step of calculating the evaluation value includes changing a size of the predetermined range so that a center of a visual field range relative to a position of a target pixel does not vary depending on a shift amount between the first and second image signals.

Further features and aspects of the present invention will become apparent from the following description of exemplary embodiments with reference to the attached drawings.

BRIEF DESCRIPTION OF THE DRAWINGS

FIGS. 12A and 12B are diagrams of explaining a method of calculating a correlation amount in which the correlation function is minimized as a comparative example.

FIGS. 13A and 13B are diagrams of explaining the method of calculating the correlation amount in which the correlation function is minimized as a comparative example.

DESCRIPTION OF THE EMBODIMENTS

Exemplary embodiments of the present invention will be described below with reference to the accompanied drawings.

Embodiment 1

Figure 1:
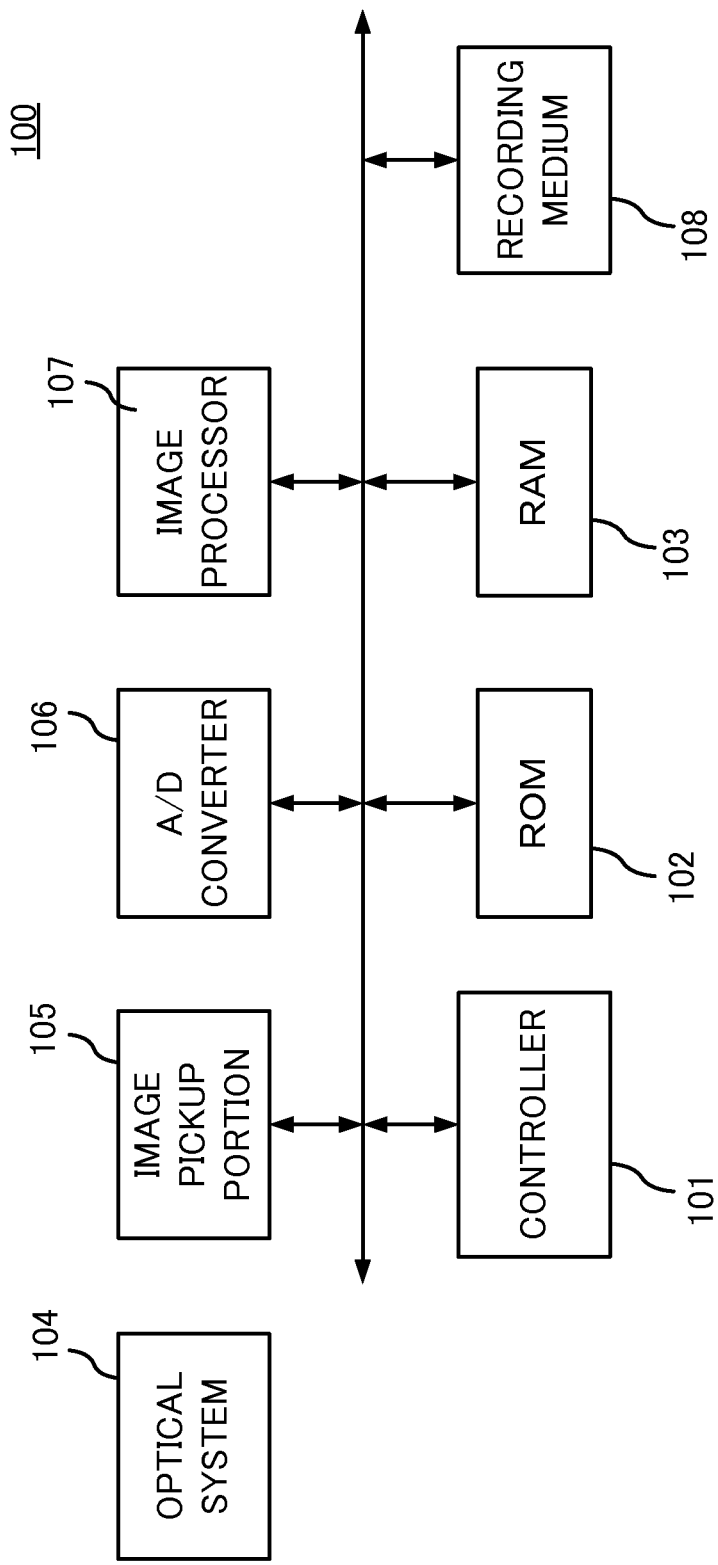
FIG. 1 is a block diagram of an image pickup apparatus in each embodiment.

First of all, referring to FIG. 1, an image pickup apparatus in Embodiment 1 of the present invention will be described. FIG. 1 is a block diagram of an image pickup apparatus 100 (digital camera) in this embodiment.

A controller 101 is for example a CPU, and it reads an operation program of each block in the image pickup apparatus 100 from a ROM 102 and develops the program in a RAM 103 to be executed to control an operation of each block in the image pickup apparatus 100. The ROM 102 is a rewritable non-volatile memory, and it stores various information such as parameters needed to perform the operation of each block, as well as the operation program of each block in the image pickup apparatus 100. The RAM 103 is a rewritable volatile memory, and it is used as a temporary storage area for data output by the operation of each block in the image pickup apparatus 100.

An optical system 104 includes lens units and it is an imaging optical system (image pickup optical system) to form an object image on an image pickup portion 105. In this embodiment, the optical system 104 is provided as an interchangeable lens removably attached to the image pickup apparatus 100 (camera body), but it is not limited thereto. This embodiment can be applied also to a case in which the optical system 104 is integrated with the image pickup apparatus 100 (camera body).

The image pickup portion 105 (image pickup unit) includes an image pickup element such as a CCD sensor and a CMOS sensor, and it performs photoelectric conversion on an object image (optical image) formed on the image pickup element via the optical system 104 to output an analog image signal to an A/D converter 106. The A/D converter 106 performs A/D conversion on the analog image signal input from the image pickup portion 105 to output a digital image signal (image data) to the RAM 103. The RAM 103 stores the image data output from the A/D converter 106.

An image processor 107 performs various image processing, such as white balance adjustment, color interpolation, reduction/magnification, and filtering, on the image data stored in the RAM 103. A recording medium 108 is for example a removable memory card, and it records, as a recorded image, the image data processed by the image processor 107 and stored in the RAM 103, the image data output from the A/D converter 106 performing the A/D conversion, and the like.

Figure 2:
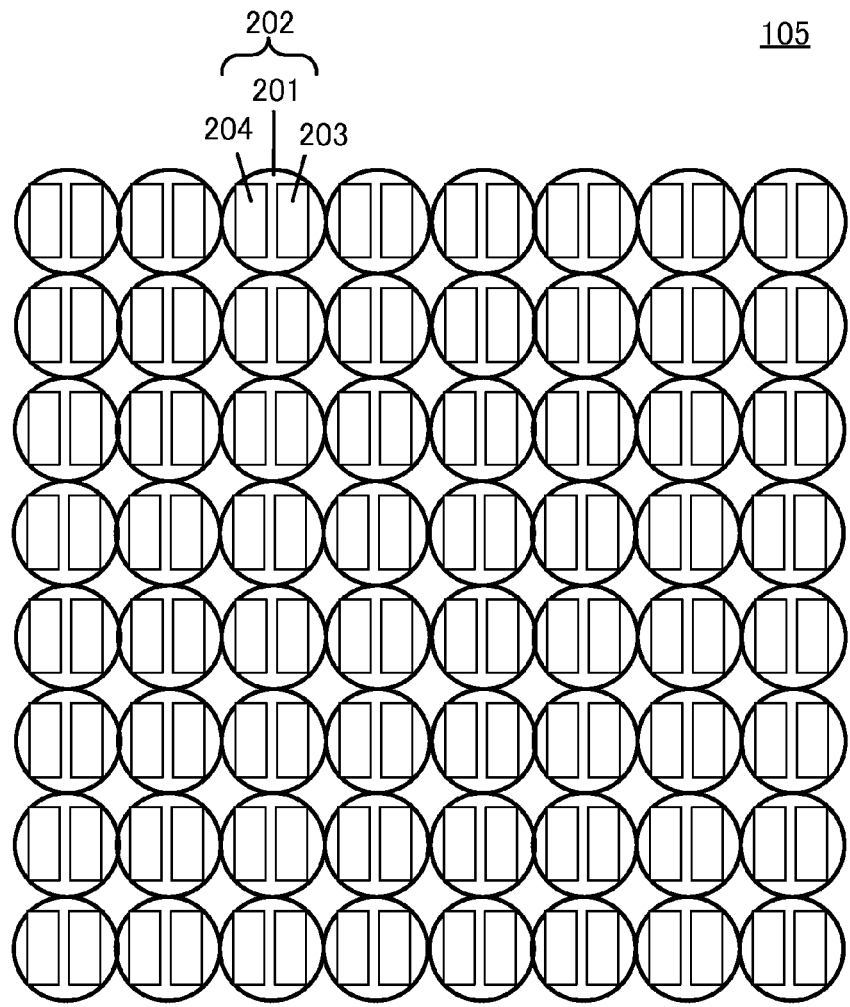
FIG. 2 is a pixel array diagram of an image pickup portion in Embodiment 1.

Subsequently, referring to FIG. 2, a pixel array of the image pickup portion 105 (image pickup element) in this embodiment will be described. FIG. 2 is a pixel array diagram of the image pickup portion 105. The image pickup portion 105 includes a plurality of pixels 202, and the pixels 202 are regularly arrayed in two dimensions. The pixel 202 includes a microlens 201 and a pair of photoelectric conversion portions 203 and 204. Hereinafter, in this embodiment, images formed on the photoelectric conversion portions 203 and 204 are referred to as an A-image and a B-image, respectively.

Figure 3:
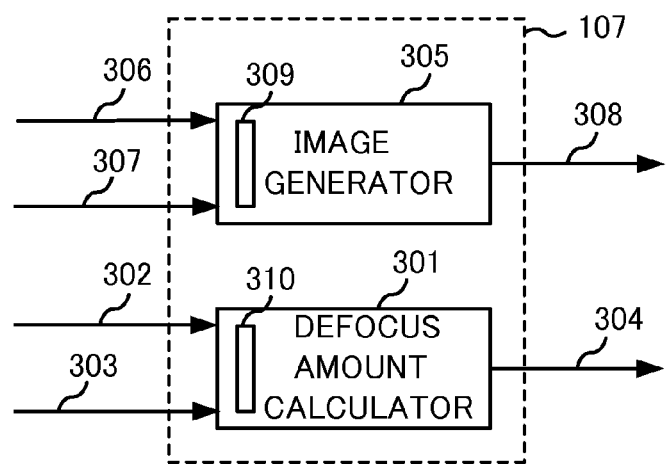
FIG. 3 is a block diagram of an image processor in Embodiment 1.

Subsequently, referring to FIG. 3, image generation and defocus amount calculation by the image processor 107 will be described. FIG. 3 is a block diagram of the image processor 107. The image processor 107 (controller) includes an image generator 305 (addition unit) and a defocus amount calculator 301 (calculation unit).

The image generator 305 adds a plurality of object images (optical images) formed based on light beams passing through regions (pupil-divided regions) in a pupil of the optical system 104 (image pickup optical system) different from each other to generate a single object image formed based on the light beams passing through an entire region in the pupil of the image pickup optical system. In other words, the image generator 305 adds an A-image signal 306 (A-image) and a B-image signal 307 (B-image) input via an input portion 309 (input unit) from the photoelectric conversion portions 203 and 204, respectively, to output an image signal 308 (added signal). The image generator 305 can reconstruct object images on other imaging planes, as well as the object image on an image pickup plane (acquisition plane) of the image pickup portion 105. With respect to a reconstruction process of an image, a known method such as a method disclosed in Japanese Patent Laid-open No. 2013-161065 may be applied.

Figure 14A:
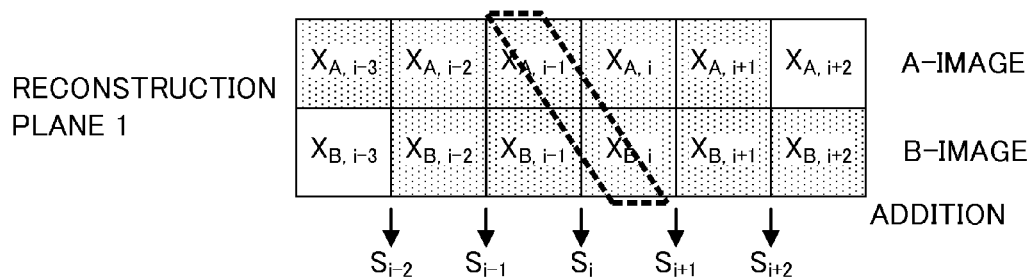
FIGS. 14A to 14C are diagrams of explaining a reconstruction process on an image by an image generator in each embodiment.
Figure 14B:
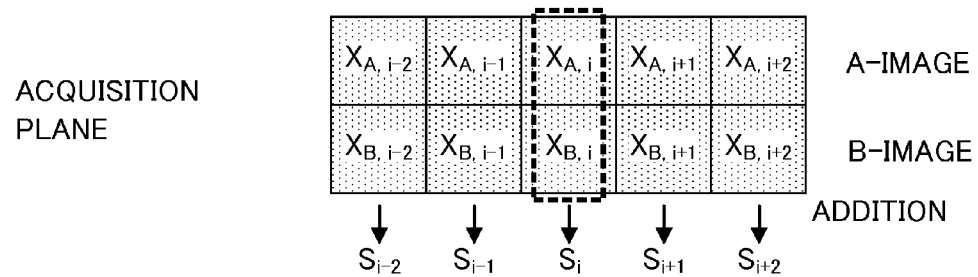
Figure 14C:
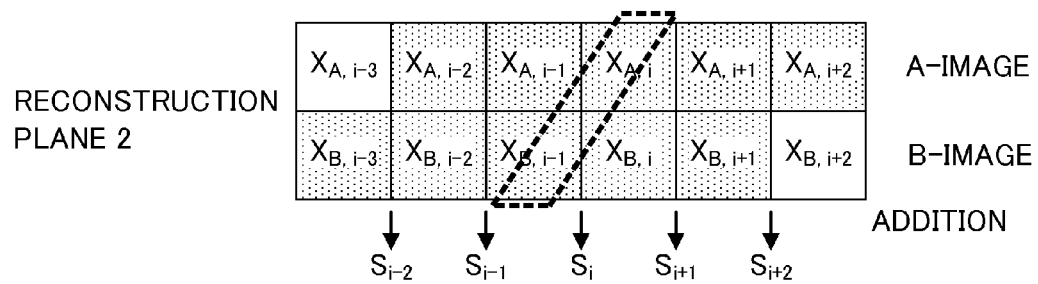

FIGS. 14A to 14C are diagrams of explaining the reconstruction process of the image by the image generator 305, which illustrate reconstructing the object images on a reconstruction plane 1, an acquisition plane, and a reconstruction plane 2, respectively. When the object image on the acquisition plane of the image pickup portion 105 is to be reconstructed, as illustrated in FIG. 14B, the A-image and the B-image are added without relatively shifting the images to obtain a reconstructed image $S_n$ (n is an integer). When the object image on the imaging plane other than the acquisition plane is to be reconstructed, as illustrated in FIGS. 14A and 14C, the A-image and the B-image are added while relatively shifting the images to obtain the reconstructed image $S_n$. As illustrated in FIGS. 14A and 14C, when a shift amount in a shift addition is an odd number, a centroid of the reconstructed image $S_n$ is displaced by a half pixel to the left. The image processor 107 performs processing such as white balance adjustment, color interpolation, reduction/magnification, and filtering on the reconstructed image output from the image generator 305. If needed, further processing such as compression and encoding may be performed on the image processed by the image processor 107, and then the processed image is recorded in the recording medium 108 as a stored or recorded image.

In FIG. 3, the defocus amount calculator 301 calculates a defocus amount at a position of a target pixel. In other words, the defocus amount calculator 301 calculates a defocus amount 304 based on the A-image signal 302 (A-image) input from the photoelectric conversion portion 203 and the B-image signal 303 (B-image) input from the photoelectric conversion portion 204 via an input portion 310 (input unit) and it outputs the defocus amount 304. The defocus amount calculator 301 calculates a correlation function (correlation amount or correlation value) or the like to calculate the defocus amount. A process of calculating the correlation function will be described in detail below. With respect to a process of calculating the defocus amount based on the correlation function, for example a method disclosed in Japanese Patent Laid-open No. 2008-15754 may be applied.

The defocus amount calculator 301 is capable of generating a defocus map that indicates a defocus amount distribution of the object by calculating the defocus amount while displacing (shifting) the position of the target pixel by each pixel. The image processor 107 can add a background blur with a desired size to the recorded image with a deep depth of field by image processing by referring to the generated defocus map. With respect to the blur adding process referring to the defocus map, for example a method disclosed in Japanese Patent Laid-open No. 2008-15754 may be applied. The controller 101 specifies the position of the target pixel as a pixel position for autofocus detection to receive the defocus amount, and thus it can use the defocus amount for an autofocusing function to perform focusing while driving a focus lens included in the optical system 104 based on the defocus amount.

Figure 11:
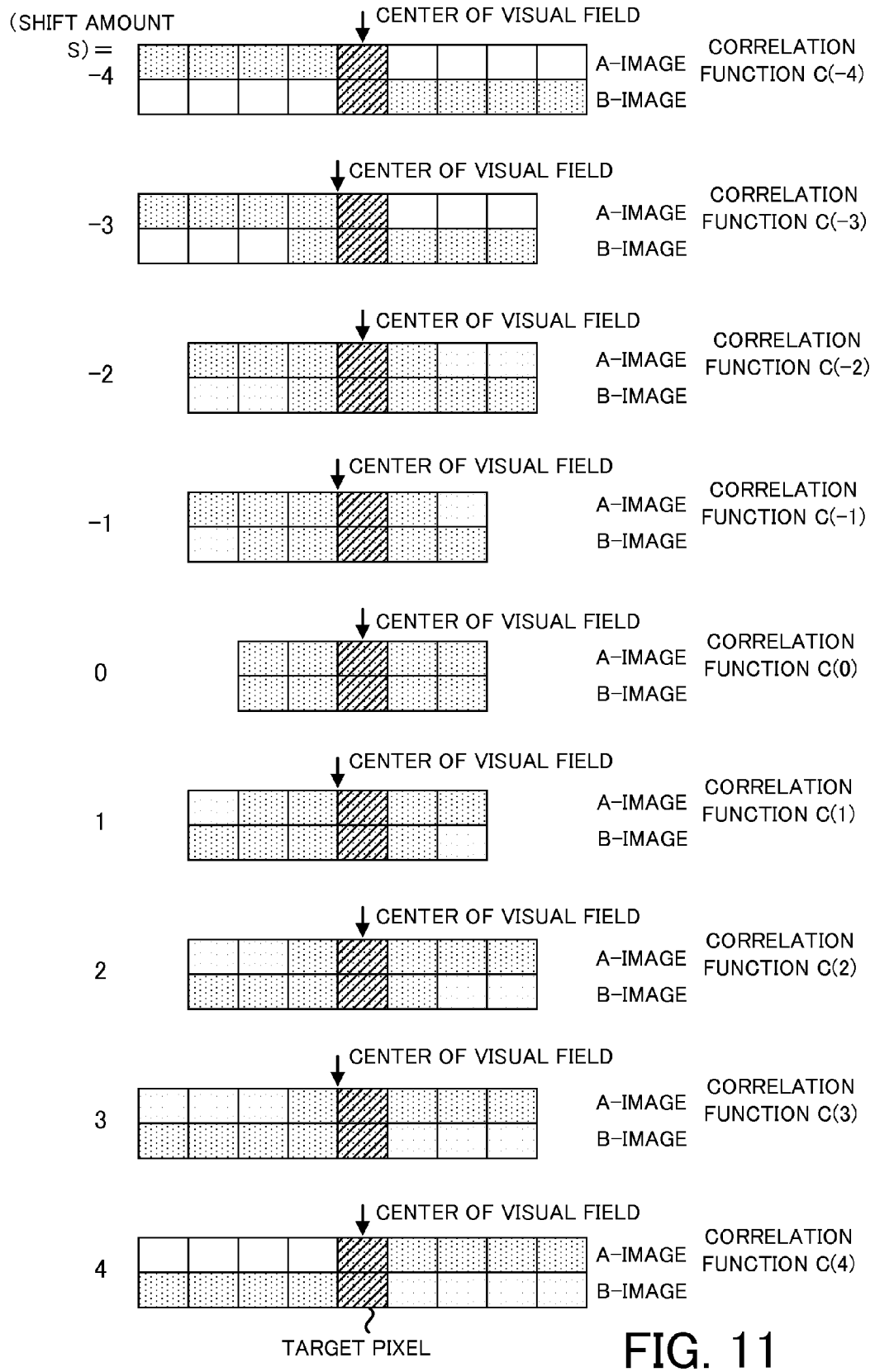
FIG. 11 is a diagram of explaining a method of calculating a correlation function as a comparative example.

Next, a correlation function C(S) in this embodiment will be described. The correlation function C(S) is obtained so that the defocus amount calculator 301 is capable of calculating the defocus amount. First, referring to FIGS. 11 to 13A and 13B, a comparative example of this embodiment will be described. FIG. 11 is a diagram of explaining a method of calculating the correlation function C(S) as a comparative example, which is basically described in Japanese Patent Laid-open No. H07-318793.

In FIG. 11, an a-sensor array and a b-sensor array are illustrated at the upper side and the lower side, respectively. Object images obtained by the a-sensor array and the b-sensor array are indicated as an A-image and a B-image respectively by gray cells (five-pixel width) with reference to a position of the target pixel (shaded pixel). The correlation function C(S) is calculated while displacing (shifting) the A-image and the B-image relatively depending on a shift amount S (S is an integer, which is within a range of −4≤S≤4 in FIG. 11).

A region combined by the gray cells and white cells is a visual field range related to the position of the target pixel, and a width of the visual field range broadens with the increase of an absolute value of the shift amount S. In FIG. 11, the visual field range is a six-pixel width when for example the shift amount S is ±1. On the other hand, the visual field range is a nine-pixel width when the shift amount S is ±4. Each arrow illustrated in FIG. 11 indicates a center of a visual field, i.e. a center of the visual field range. The correlation function C(S) at the center of the visual field is calculated by the following expression (1).

$$C(S)=\Sigma|a(n+s)-b(n)| \quad (1)$$

As illustrated in FIG. 11, when the shift amount S is an even number, the center of the visual field and the position of the target pixel coincide with each other. On the other hand, when the shift amount S is an odd number, the center of the visual field is displaced (shifted) by a half pixel relative to the position of the target pixel. In this embodiment, the correlation function C(S) is calculated on condition that the shift amount S is an integer. Therefore, a correlation amount Sm (correlation value or relative variation amount) at which the correlation function C(S) is minimized needs to be obtained with sub-pixel accuracy by using an interpolation process. Then, the defocus amount is calculated based on the correlation amount Sm.

Subsequently, referring to FIGS. 12A and 12B, a method of calculating the correlation amount Sm at which the correlation function C(S) is minimized by the using a method of three-point interpolation will be described. FIGS. 12A and 12B are diagrams of explaining the method of calculating the correlation amount Sm, and the same method is disclosed in Japanese Patent Laid-open No. 2008-15754. In each of FIGS. 12A and 12B, a horizontal axis and a vertical axis indicate the shift amount S and the correlation function C(S), respectively. FIG. 12A illustrates the shift amount S in a range of −4≤S≤4, and FIG. 12B illustrates the shift amount S in a range of 0≤S≤4 (enlarged view of part of FIG. 12A).

As illustrated in FIGS. 12A and 12B, the correlation function C(S) (correlation value) is minimized when the shift amount S is 2 (with accuracy of integers). The correlation amount Sm with sub-pixel accuracy is equal to 2.29 (Sm=2.29) by the interpolation using the expression disclosed in Japanese Patent Laid-open No. 2008-15754 according to S=1, 2, and 3. Using the correlation amount Sm, the defocus amount can be calculated.

Subsequently, referring to FIGS. 13A and 13B, a case in which a correct interpolation calculation cannot be performed by using the method of three-point interpolation will be described. FIGS. 13A and 13B are diagrams of explaining the method of calculating the correlation amount Sm, which illustrate a case in which a correct interpolation calculation cannot be performed. In each of FIGS. 13A and 13B, a horizontal axis and a vertical axis indicate the shift amount S and the correlation function C(S), respectively. FIG. 13A illustrates the shift amount S in a range of −4≤S≤4, and FIG. 13B illustrates the shift amount S in a range of 0≤S≤4 (enlarged view of part of FIG. 13A).

As illustrated in FIG. 11, when the shift amount S is an even number, the position of the target pixel and the position of the center of the visual field coincide with each other. Therefore, the correlation function C(S) in this case is calculated at the position of the target pixel. On the other hand, when the shift amount S is an odd number, the position of the center of the visual field is displaced by a half pixel to the left relative to the position of the target pixel. Therefore, the correlation function C(S) in this case is calculated at a position displaced by a half pixel to the left relative to the position of the target pixel.

In the method of calculating the correlation function as a comparative example, the correlation function C(S) may be displaced since the position of the center of the visual field relative to the target pixel varies depending on the shift amount S, i.e. whether the shift amount S is either one of an even or odd number. The correlation function C(S) is calculated by a sigma accumulation represented by expression (1), and accordingly, a first accumulated value and a final accumulated value in the sigma accumulation by expression (1) are affected by the displacement by a half pixel for the center of the visual field.

When there is no texture at positions of right-end and left-end pixels for the A-image and the B-image, the first accumulated value and the final accumulated value in the sigma accumulation by expression (1) become small. Therefore, the correlation function C(S) is not displaced regardless of the shift amount S of the even or odd number. As a result, as illustrated in FIGS. 12A and 12B, the correlation function C(S) determined when the shift amount S is the even number and the correlation function C(S) determined when the shift amount S is the odd number are located on the same curved line.

On the other hand, when there are textures at positions of the right-end and left-end pixels for the A-image and the B-image, the first accumulated value and the final accumulated value in the sigma accumulation by expression (1) increase. Therefore, the correlation function C(S) is displaced depending on whether the shift amount S is the even or odd number. As a result, as illustrated in FIGS. 13A and 13B, the correlation function C(S) determined when the shift amount S is an even number and the correlation function C(S) determined when the shift amount S is an odd number are not located on the same curved line. Accordingly, in the case of FIGS. 13A and 13B, the three-point interpolation calculation cannot be precisely performed, and thus the correlation amount Sm indicates a value shifted from a correct value (Sm=2.29) illustrated in FIGS. 12A and 12B and it indicates an incorrect value (Sm=2.57). In order to solve this problem, this embodiment calculates the correlation function C(S) by using the following method.

Figure 4:
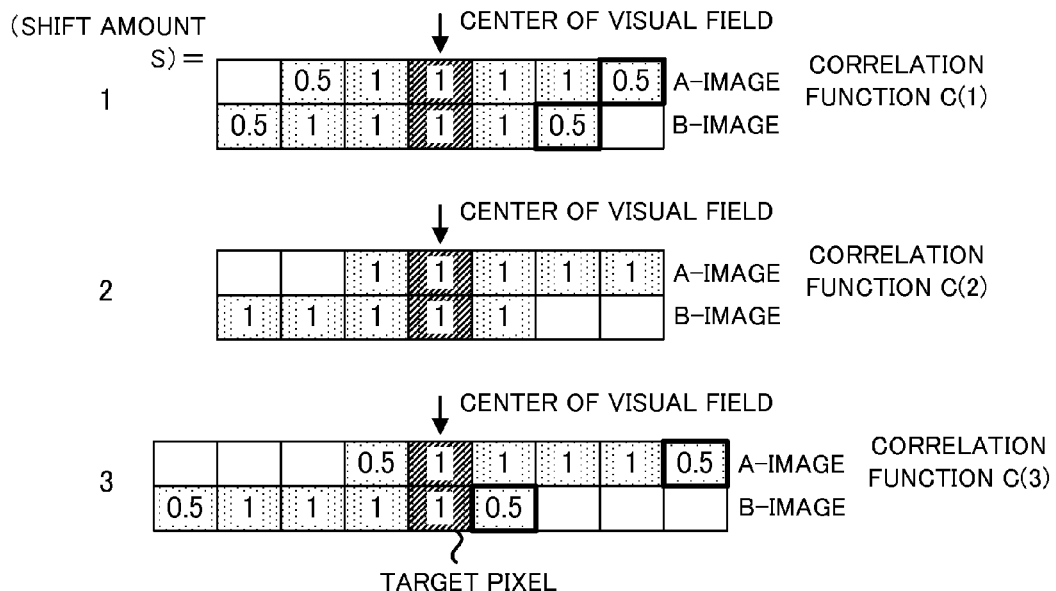
FIG. 4 is a diagram of explaining a method of calculating a correlation function by a defocus amount calculator in Embodiment 1.
Figure 5:
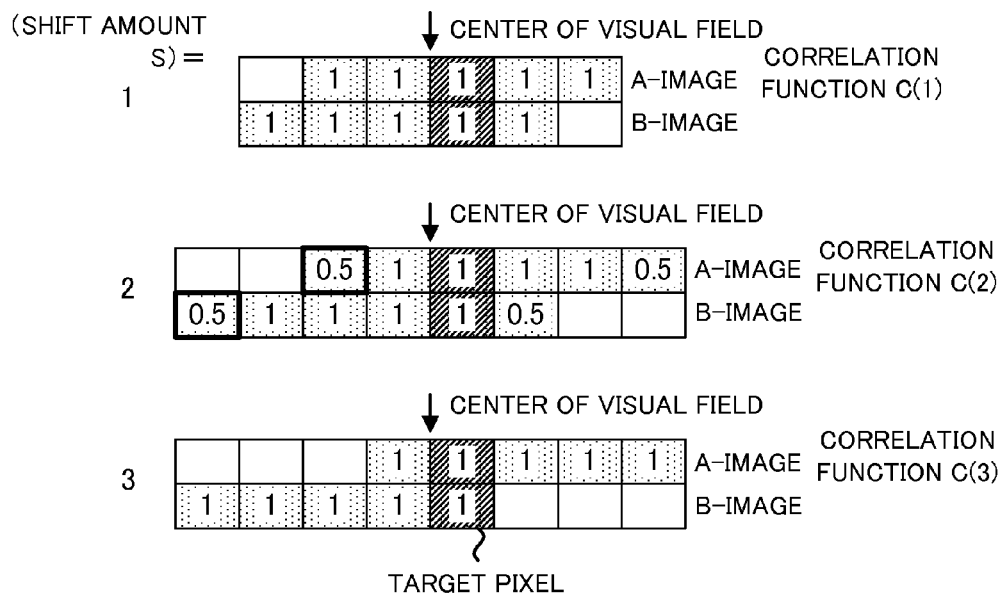
FIG. 5 is a diagram of explaining the method of calculating the correlation function by the defocus amount calculator in Embodiment 1.

Subsequently, referring to FIGS. 4 and 5, a method of calculating a correlation function C(S) in this embodiment will be described. FIGS. 4 and 5 are diagrams of explaining the correlation function C(S) in this embodiment. The defocus amount calculator 301 calculates the correlation function C(S) by using SAD (Sum of Absolute Difference) represented by expression (1), and specifically it accumulates difference absolute values (absolute differences) between the A-image and the B-image.

In each of FIGS. 4 and 5, an a-sensor array and a b-sensor array are illustrated at the upper side and the lower side, respectively. Object images obtained by the a-sensor array and the b-sensor array are indicated as an A-image and a B-image respectively by gray cells (five-pixel width or six-pixel width) with reference to a position of the target pixel (shaded pixel). Each arrow illustrated in FIGS. 4 and 5 indicates a center of the visual field, i.e. a center of the visual field range. The number in the gray cell indicates a weighting coefficient to be applied to the difference absolute value between the A-image and the B-image. In this embodiment, the defocus amount calculator 301 accumulates the difference absolute values to which the weighting coefficient of 1 or 0.5 is applied while relatively displacing the A-image and the B-image depending on the shift amount S to calculate the correlation function C(S).

First, the correlation function C(S) in FIG. 4 will be described. When the shift amount S is an even number, the correlation function C(S) is calculated similarly to FIG. 11. On the other hand, when the shift amount S is an odd number, widths of the A-image and the B-image are increased by a pixel to the right compared to FIG. 11 to be six-pixel widths. Thus, the center of the visual field is displaced by a half pixel to the right compared to the case (five-pixel widths) of FIG. 11. Therefore, similarly to the case where the shift amount S is the even number, the position of the target pixel and the position of the center of the visual field coincide with each other (i.e. the position of the center of the visual field relative to the position of the target pixel is constant regardless of the shift amount S of the even or odd number). As a result, the correlation function C(S) determined when the shift amount S is the even number and the correlation function C(S) determined when the shift amount S is the odd number are located on the same curved line regardless of the shapes of the A-mage and the B-image, and accordingly the three-point interpolation calculation can be precisely performed. In addition, since a sum of the weighting coefficients is kept to be constant (in this embodiment, sum (i.e. five) of the weighing coefficient (i.e. one) for the five-pixel width is kept) even when the pixel width increases by a pixel, the weighting coefficients for the right-end and left-end pixels are changed (in this embodiment, they are set to 0.5).

Subsequently, the correlation function C(S) in FIG. 5 will be described. When the shift amount S is an odd number, the correlation function C(S) is calculated similarly to FIG. 11. On the other hand, when the shift amount S is an even number, widths of the A-image and the B-image are increased by a pixel to the left compared to FIG. 11 to be six-pixel widths. Thus, the center of the visual field is displaced by a half pixel to the left compared to the case (five-pixel widths) of FIG. 11. Therefore, similarly to the case where the shift amount S is the odd number, the position of the center of the visual field is displaced by a half pixel to the left relative to the position of the target pixel (i.e. the position of the center of the visual field relative to the position of the target pixel is constant regardless of the shift amount S of the even or odd number). As a result, the three-point interpolation calculation can be precisely performed even in the case of FIG. 5. In this embodiment, the weighting coefficients for the right-end and left-end pixels are set to 0.5.

When the centroid (center of the visual field) of the reconstructed image generated by the image generator 305 is located at an integer-pixel position (for example, the reconstructed image $S_n$ in FIG. 14B), the defocus amount calculator 301 calculates the correlation function C(S) of FIG. 4. On the other hand, when the centroid (center of the visual field) of the reconstructed image generated by the image generator 305 is located at a half-pixel position (for example, the reconstructed image $S_n$ in each of FIGS. 14A and 14C), the defocus amount calculator 301 calculates the correlation function C(S) of FIG. 5. Accordingly, when generating the defocus map, the defocus amount calculator 301 can align the centroids of the reconstructed image and the defocus map.

As described above, FIG. 11 and FIGS. 4 and 5 describes the case where a sum of the weighting coefficients is five (odd number), but this embodiment is not limited thereto. Subsequently, referring to FIG. 15 and FIGS. 6 and 7, a method of calculating the correlation function C(S) in a case where a sum of the weighting coefficients are four (even number) will be described.

Figure 15:
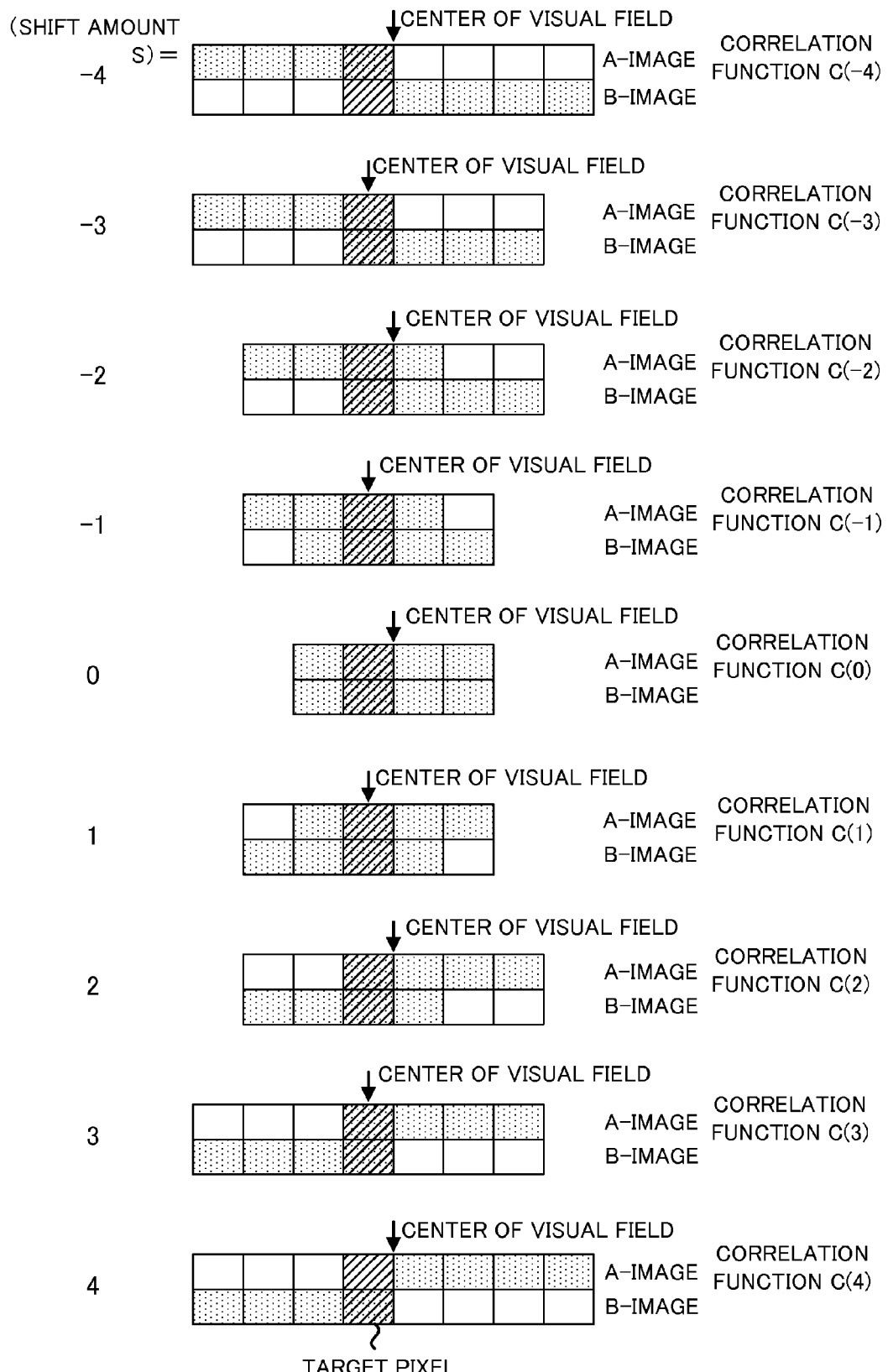
FIG. 15 is a diagram of explaining the method of calculating the correlation function as a comparative example.

FIG. 15 is a diagram of explaining the correlation function C(S) as a comparative example. In FIG. 15, similarly to FIG. 11, the position of the center of the visual field is displaced (shifted) by a half pixel depending on the shift amount S, i.e. whether the shift amount S is either one of an even or odd number. Therefore, the correlation function C(S) determined when the shift amount S is an even number and the correlation function C(S) determined when the shift amount S is an odd number are not located on the same curved line depending on the shapes of the A-image and the B-image, and thus the three-point interpolation calculation cannot be precisely performed in some cases.

Figure 6:
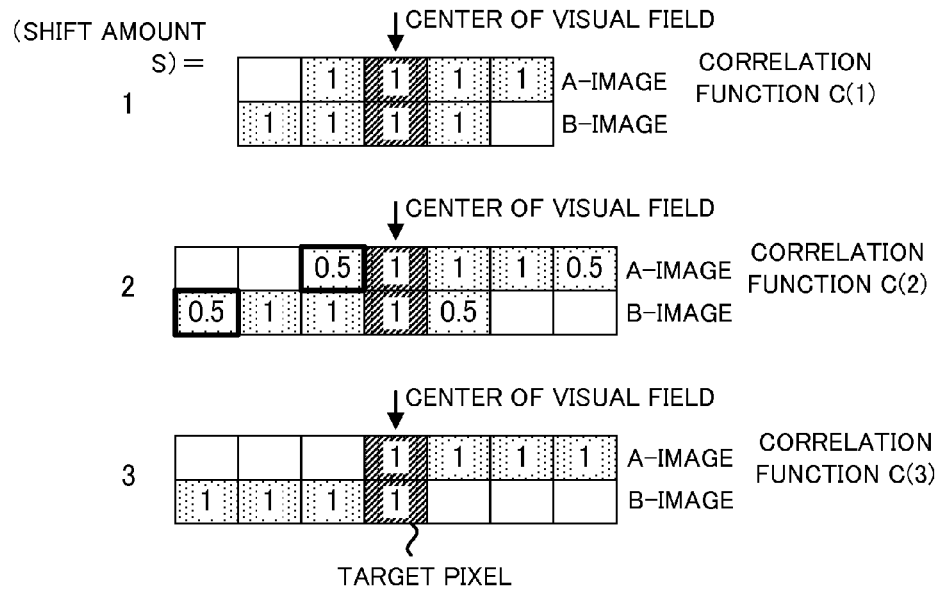
FIG. 6 is a diagram of explaining the method of calculating the correlation function by the defocus amount calculator in Embodiment 1.
Figure 7:
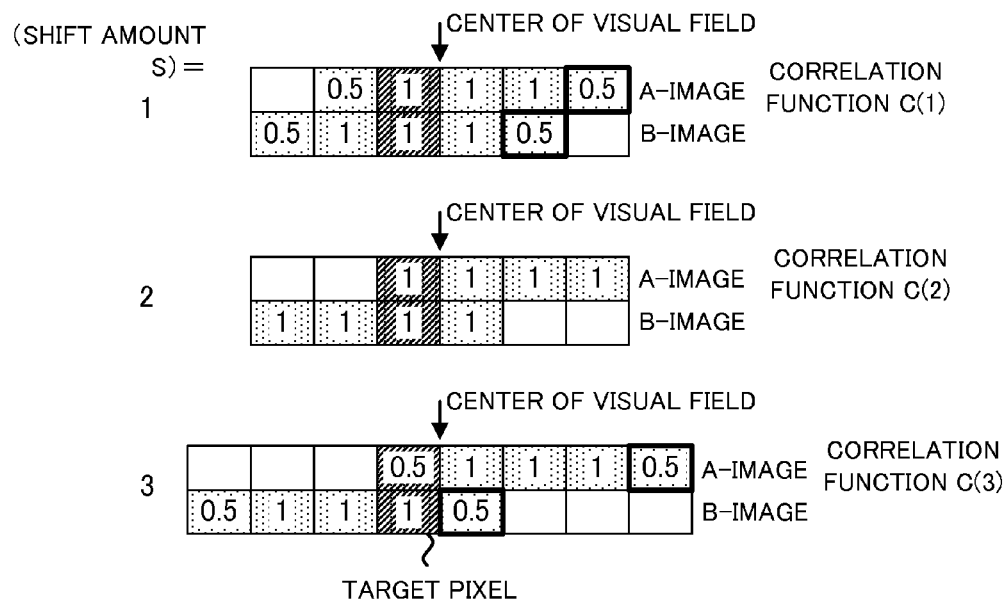
FIG. 7 is a diagram of explaining the method of calculating the correlation function by the defocus amount calculator in Embodiment 1.

FIGS. 6 and 7 are diagrams of explaining the correlation function C(S) in this embodiment. First, the correlation function C(S) in FIG. 6 will be described. When the shift amount S is an odd number, the correlation function C(S) is calculated similarly to FIG. 15. On the other hand, when the shift amount S is an even number, widths of the A-image and the B-image are increased by a pixel to the left compared to FIG. 15 to be five-pixel widths. In this case, the position of the center of the visual field is displaced by a half pixel to the left compared to the case of FIG. 15. Therefore, the center of the visual field determined when the shift amount S is the even number coincides with the center of the visual field determined when the shift amount S is the odd number. As a result, the correlation function C(S) determined when the shift amount S is the even number and the correlation function C(S) determined when the shift amount S is the odd number are located on the same curved line regardless of the shapes of the A-image and the B-image, and therefore the three-point interpolation calculation can be precisely performed. Since a sum of the weighting coefficients is kept to be constant (in this embodiment, the sum is four) even when the pixel width increases by a pixel, the weighting coefficients for the right-end and left-end pixels are set to 0.5.

Subsequently, the correlation function C(S) in FIG. 7 will be described. When the shift amount S is an even number, the correlation function C(S) is calculated similarly to FIG. 15. On the other hand, when the shift amount S is an odd number, widths of the A-image and the B-image are increased by a pixel to the right compared to FIG. 15 to be five-pixel widths. In this case, the position of the center of the visual field is displaced by a half pixel to the right compared to the case of FIG. 15. Therefore, the center of the visual field determined when the shift amount S is the even number coincides with the center of the visual field determined when the shift amount S is the odd number. As a result, the three-point interpolation calculation can be precisely performed even in this case. The weighting coefficients for the right-end and left-end pixels are set to 0.5.

When the centroid (center of the visual field) of the reconstructed image generated by the image generator 305 is located at an integer-pixel position (for example, the reconstructed image $S_n$ in FIG. 14B), the defocus amount calculator 301 calculates the correlation function C(S) of FIG. 6. On the other hand, when the centroid (center of the visual field) of the reconstructed image generated by the image generator 305 is located at a half-pixel position (for example, the reconstructed image $S_n$ in each of FIGS. 14A and 14C), the defocus amount calculator 301 calculates the correlation function C(S) of FIG. 7. Accordingly, when generating the defocus map, the defocus amount calculator 301 can align the centroids of the reconstructed image and the defocus map.

In this embodiment, the correlation function C(S) is calculated by using the SAD represented by expression (1). However, this embodiment is not limited thereto, and alternatively the NCC (Normalized Cross Correlation) represented by the following expressions (2) and (3) may be used.

$$C(S)=\Sigma a(n+s) \times b9n)/\delta \quad (2)$$

$$\delta(S)=(\sqrt{\Sigma a(n+s)^2}) \times (\sqrt{\Sigma b(n)^2}) \quad (3)$$

While the SAD decreases with the increase of the correlation, the NCC increases with the increase of the correlation. Therefore, when the method of three-point interpolation is applied to the NCC, it is necessary to set the value to decrease with the increase of the correlation by inversing a sign of the correlation function C(S) in advance or the like. Correlation expressions other than the SAD and the NCC may be used if a degree of coincidence for a pair of object images can be calculated.

In this embodiment, the correlation amount Sm (relative variation amount) is obtained by using the correlation function C(S). However, this embodiment is not limited thereto, and alternatively the correlation amount Sm may be obtained by using an image-quality evaluation value disclosed in Japanese Patent Laid-open No. 2013-235047 or the like. The image-quality evaluation value disclosed in Japanese Patent Laid-open No. 2013-235047 is P(S) represented by the following expression (5).

$$F(n,S)=a(n+s)+b(n) \quad (4)$$

$$P(S)=\Sigma|-F(n-1,S)+2 \times F(n,S)-F(n+1,S)| \quad (5)$$

In expression (4), symbol F(n,S) denotes a reconstructed image on the image pickup plane of the image pickup portion 105 and other imaging planes, and it is obtained by adding the A-image and the B-image while shifting them by the shift amount S. Since the image-quality evaluation value P(S) is, as represented by expression (5), an integrated value of the amplitude determined after applying a high-pass filter to the reconstructed image F(n,S), it corresponds to an evaluation value of a focusing degree of the reconstructed image F (n,S). An imaging plane on which the focusing degree is maximized is the imaging plane of the optical system 104, and a difference between the imaging plane of the optical system 104 and the image pickup plane (light receiving plane) of the image pickup portion 105 is the defocus amount. Therefore, the defocus amount calculator 301 is capable of calculating the defocus amount by obtaining the correlation amount Sm at which the image-quality evaluation value P(S) is maximized. The image-quality evaluation value P(S) increases with the increase of the focusing degree. Therefore, when applying the method of three-point interpolation to the image-quality evaluation value, it is necessary to set the value to decrease with the increase of the focusing degree by inversing the sign of the image-quality evaluation value P(S) in advance. Focusing degree expressions other than the image-quality evaluation value may be used if the focusing degree of the reconstructed image can be calculated.

According to this embodiment, an image pickup apparatus can be provided which is capable of performing correct three-point interpolation calculation regardless of an object image when detecting a defocus amount by a pupil-divided phase difference detection method for dividing a pupil into two regions horizontally.

Embodiment 2

Next, an image pickup apparatus in Embodiment 2 of the present invention will be described. A basic configuration of the image pickup apparatus in this embodiment is the same as that of the image pickup apparatus 100 in Embodiment 1 described referring to FIG. 1.

Figure 8:
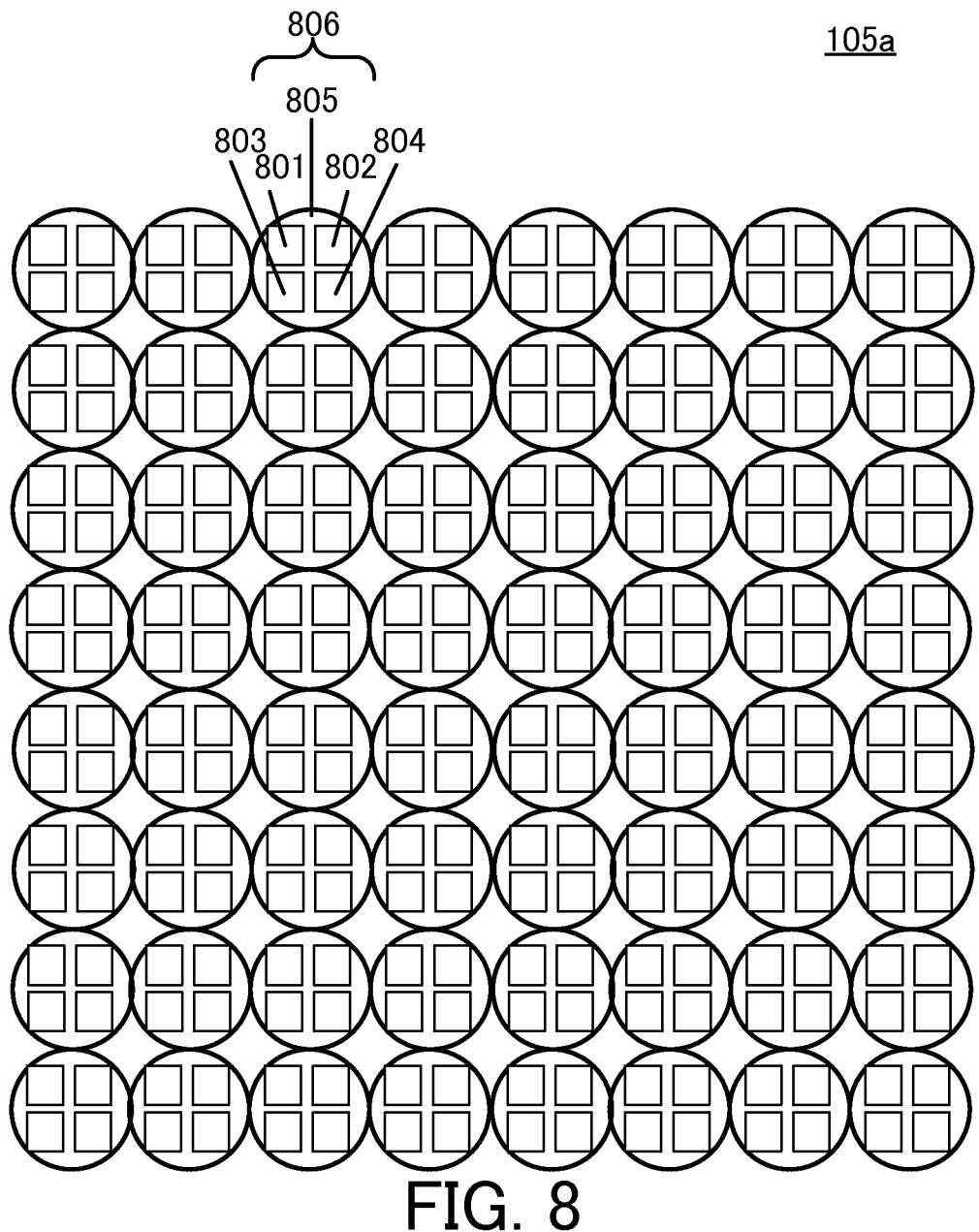
FIG. 8 is a pixel array diagram of an image pickup unit in Embodiment 2.

Referring to FIG. 8, a pixel array of an image pickup portion 105a (image pickup element) in this embodiment will be described. FIG. 8 is a pixel array diagram of the image pickup portion 105a. The image pickup portion 105a includes a plurality of pixels 806, and the pixels 806 are regularly arrayed in two dimensions. Each of the pixels 806 includes a microlens 805 and two pairs of photoelectric conversion portions 801 and 804 and photoelectric conversion portions 802 and 803. Hereinafter, in this embodiment, images formed by the photoelectric conversion portions 801, 802, 803, and 804 are referred to as an A-image, a B-image, a C-image, and a D-image, respectively.

Figure 9:
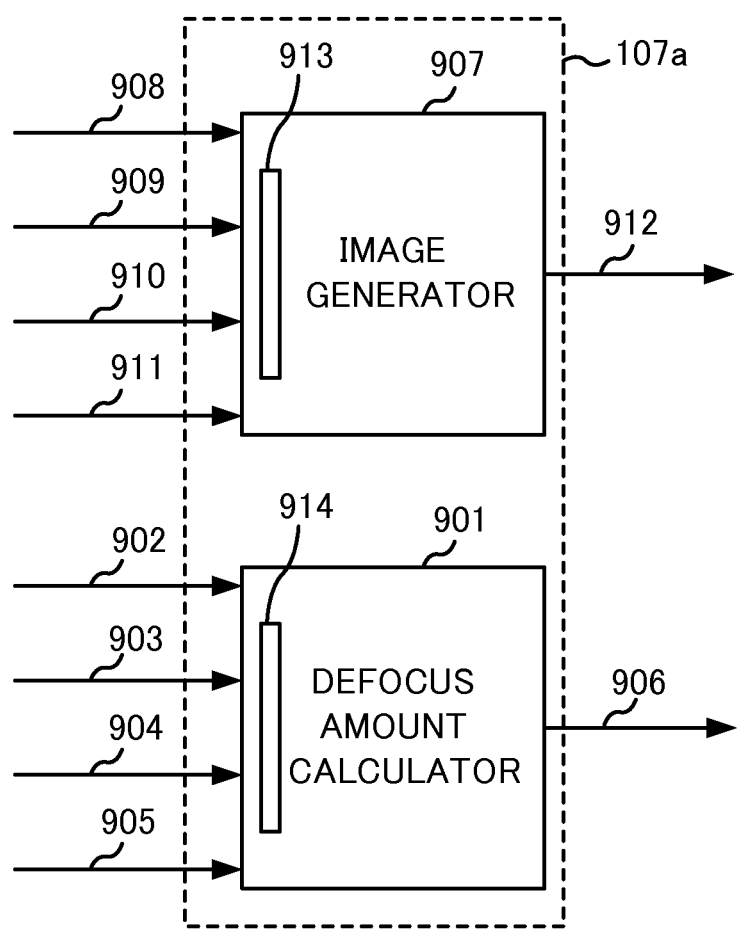
FIG. 9 is a block diagram of an image processor in Embodiment 2.

Subsequently, referring to FIG. 9, image generation and defocus amount calculation by an image processor 107a will be described. FIG. 9 is a block diagram of the image processor 107a. The image processor 107a (controller) includes an image generator 907 (addition unit) and a defocus amount calculator 901 (calculation unit).

The image generator 907 adds a plurality of object images (optical images) formed based on light beams passing through regions (pupil-divided regions) in a pupil of the optical system 104 (image pickup optical system) different from each other to generate a single object image formed based on the light beams passing through an entire region in the pupil of the image pickup optical system. In other words, the image generator 907 adds an A-image signal 908 (A-image), a B-image signal 909 (B-image), a C-image signal 910 (C-image), and a D-image signal 911 (D-image) input via an input portion 913 (input unit) from the photoelectric conversion portions 801, 802, 803, and 804, respectively. Then, the image generator 907 outputs an image signal 912 (added signal) generated by adding each of the image signals. The image generator 907 reconstructs an object image on an image pickup plane (acquisition plane) of the image pickup portion 105. The image processor 107a performs processing such as white balance adjustment, color interpolation, reduction/magnification, and filtering on the reconstructed image output from the image generator 907. The image processed by the image processor 107a is recorded in the recording medium 108 as a recorded image.

In FIG. 9, the defocus amount calculator 901 calculates a defocus amount at a position of a target pixel. In other words, the defocus amount calculator 901 inputs an A-image signal 902 (A-image), a B-image signal 903 (B-image), a C-image signal 904 (C-image), and a D-image signal 905 (D-image) input via an input portion 914 (input unit) from the photoelectric conversion portions 801, 802, 803, and 804, respectively. Then, the defocus amount calculator 901 calculates a defocus amount 906 based on each of the input image signals and outputs the defocus amount 906. The defocus amount calculator 901 calculates a correlation function (correlation amount or correlation value) or the like to calculate the defocus amount.

The defocus amount calculator 901 is capable of generating a defocus map that indicates a defocus amount distribution of the object by calculating the defocus amount while displacing (shifting) the position of the target pixel by each pixel. The image processor 107a (defocus amount calculator 901) can add a background blur with a desired size to the recorded image with a deep depth of field by image processing by referring to the generated defocus map. The defocus amount calculator 901 (controller 101) specifies the position of the target pixel as a pixel position for autofocus detection to calculate the defocus amount, and thus it can use the calculated defocus amount for the autofocus detection.

Figure 16:
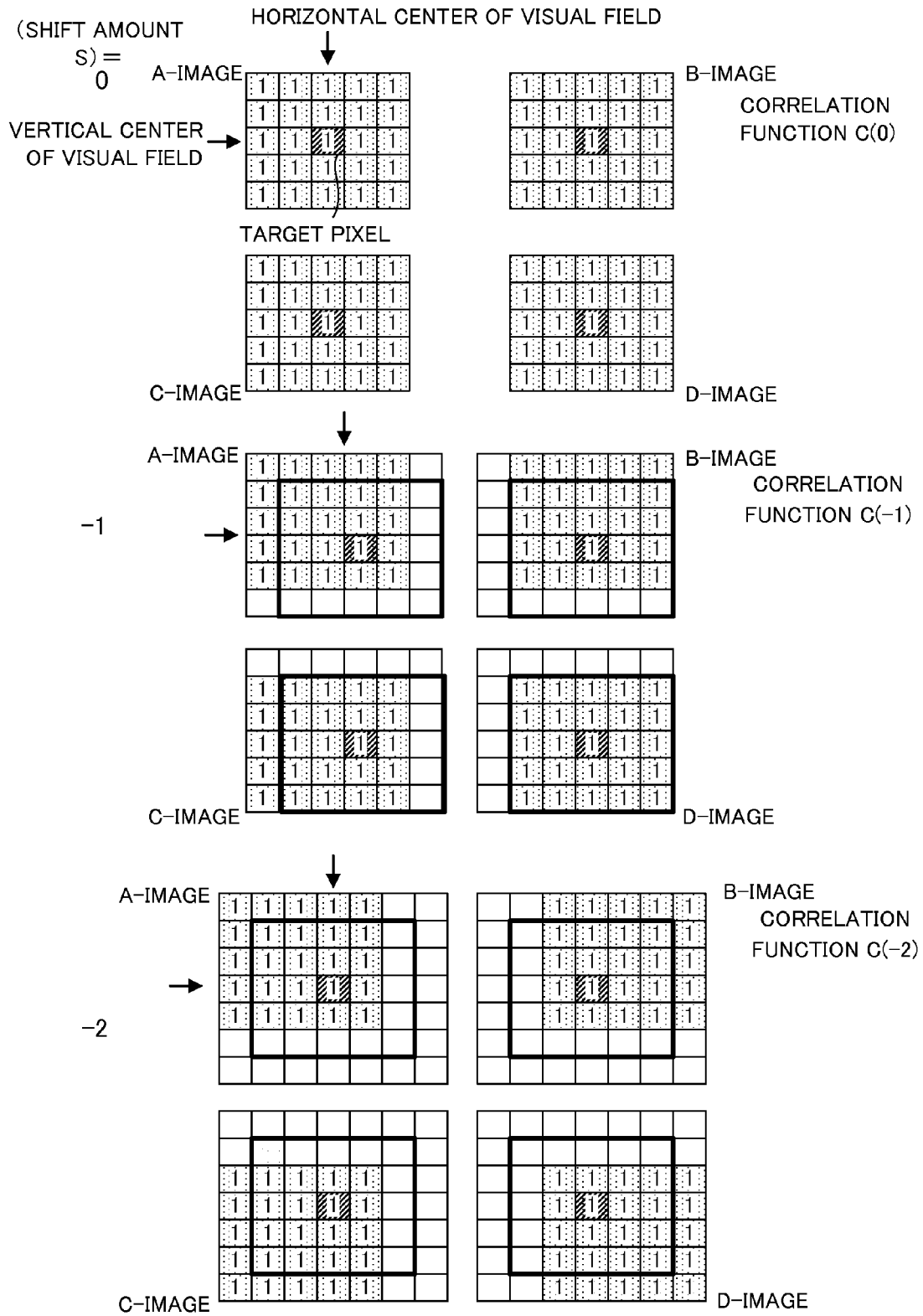
FIG. 16 is a diagram of explaining the method of calculating the correlation function as a comparative example.

Subsequently, a correlation function C(S) in this embodiment will be described. First, referring to FIG. 16, a comparative example of this embodiment will be described. FIG. 16 is a diagram of explaining a method of calculating the correlation function C(S) as a comparative example.

In FIG. 16, an a-sensor group, a b-sensor group, a c-sensor group, and a d-sensor group are illustrated at the upper left, upper right, lower left, and lower right, respectively. Object images obtained by the a-sensor group, the b-sensor group, the c-sensor group, and the d-sensor group are indicated as an A-image, a B-image, a C-image, and a D-image respectively by gray cells (5×5 pixels) with reference to a position of the target pixel (shaded pixel). The correlation function C(S) is calculated while displacing (shifting) the A-image, the B-image, the C-image, and the D-image relatively depending on a shift amount S (S is equal to 0, −1, or −2 in FIG. 16).

A region combined by the gray cells and white cells is a visual field range related to the position of the target pixel, and a width of the visual field range broadens with the increase of an absolute value of the shift amount S. Each arrow illustrated in FIG. 16 indicates a center of a visual field (horizontal center of a visual field or vertical center of a visual field), i.e. a center of the visual field range. Applying the correlation function C(S) represented by expression (1) to the image pickup portion 105a (image pickup element) in FIG. 8, the correlation function C(S) at the center of the visual field in this embodiment is represented by the following expression (6).

$$C(S)=\Sigma|a(n+s,n+s)-d(n,n)|+\Sigma|b(n,n+s)-c(n+s,n)| \quad (6)$$

In the method of FIG. 16 as a comparative example, when the shift amount S is an even number, the center of the visual field and the position of the target pixel coincide with each other. On the other hand, when the shift amount S is an odd number, the center of the visual field is displaced (shifted) by a half pixel relative to the position of the target pixel. In other words, similarly to FIG. 11, the center of the visual field is displaced by a half pixel depending on the shift amount S, i.e. whether the shift amount S is either one of an even or odd number. Therefore, the correlation function C(S) determined when the shift amount S is an even number and the correlation function C(S) determined when the shift amount S is an odd number are not located on the same curved line depending on the shapes of the A-image, the B-image, the C-image, and the D-image, and thus the three-point interpolation calculation cannot be precisely performed in some cases.

Figure 10:
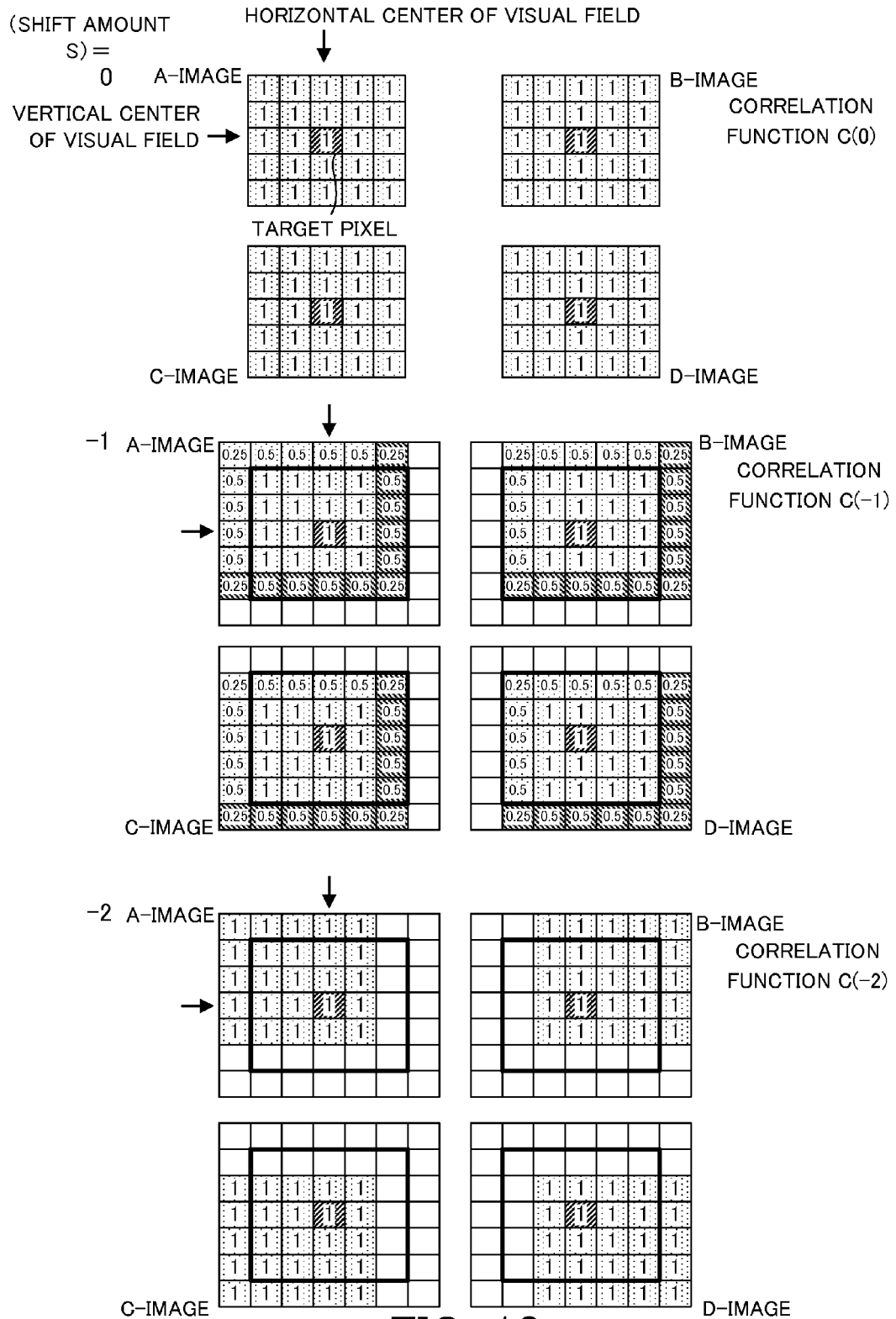
FIG. 10 is a diagram of explaining a method of calculating a correlation function by a defocus amount calculator in Embodiment 2.

Subsequently, referring to FIG. 10, a method of calculating the correlation function C(S) in this embodiment will be described. FIG. 10 is a diagram of explaining the correlation function C(S) in this embodiment. In FIG. 10 (this embodiment), when the shift amount S is an even number, the correlation function C(S) is calculated similarly to FIG. 16 (comparative example). On the other hand, when the shift amount S is an odd number, the sizes (widths) of the A-image, the B-image, the C-image, and the D-image increase by a pixel to the lower side and to the right side, compared to FIG. 16, to be 6×6 pixels. Accordingly, the center of the visual field is displaced by a half pixel to the lower side and the right side compared to FIG. 16 (five-pixel widths). Therefore, similarly to the case in which the shift amount S is the even number, the position of the target pixel and the position of the center of the visual field coincide with each other (i.e. the position of the center of the visual field relative to the position of the target pixel is constant regardless of the shift amount S of the even or odd number). As a result, the correlation function C(S) determined when the shift amount S is the even number and the correlation function C(S) determined when the shift amount S is the odd number are located on the same curved line regardless of the shapes of the A-image, the B-image, the C-image, and the D-image, and therefore the three-point interpolation calculation can be precisely performed. Since a sum of the weighting coefficients is kept to be constant (in this embodiment, 25 as a sum of the weighting coefficient 1 for 5×5 pixels is kept) even when the pixel size (pixel widths) to the lower side and to the right side increases by a pixel, the weighting coefficients for peripheral pixels are changed. In this embodiment, as illustrated in FIG. 10, the weighting coefficient for four corner pixels is set to 0.25 and the weighting coefficient for peripheral pixels except the four corner pixels is set to 0.5.

According to this embodiment, an image pickup apparatus can be provided which is capable of performing correct three-point interpolation calculation regardless of an object image when detecting a defocus amount by a pupil-divided phase difference detection method for dividing a pupil into four regions horizontally.

As described above, in each embodiment, the image pickup unit (image pickup portion 105) receives an incident light beam from regions (pupil-divided regions) of a pupil of an optical system 104 different from each other to output a first image signal (A-image signal) and a second image signal (B-image signal). A calculation unit (defocus amount calculator 301 or 901 of an image processor 107) calculates an evaluation value (defocus evaluation value) while relatively shifting the first and second image signals (phases of the image signals) from pixels included in a predetermined range to calculate a defocus amount. Then, the calculation unit changes a size (number of reference pixels) of the predetermined range so that a center of a visual field range (center of the visual field) relative to a position of a target pixel does not vary depending on a shift amount between the first and second image signals. In other words, the calculation unit changes the size of the predetermined range so that a position of the center of the visual field is fixed even in any shift amount. The predetermined range means a range of pixels in each sensor array corresponding to an object image, and for example is a range illustrated by gray cells in each of FIGS. 4 to 7 and 10.

Preferably, the center of the visual field range coincides with a center of the target pixel or is displaced by a half pixel from a center of the target pixel. Preferably, the calculation unit sets the number of the pixels included in the predetermined range to an even number when the shift amount is a first shift amount. On the other hand, the calculation unit sets the number of the pixels included in the predetermined range to an odd number when the shift amount is a second shift amount.

Preferably, an image pickup apparatus 100 further includes an addition unit (image generator 305 or 907) which adds the first and second image signals. More preferably, the addition unit adds the first and second image signals shifted by a third shift amount from each other (acquires a reconstructed image). Then, the calculation unit shifts the first and second image signals by a fourth shift amount to calculate the evaluation value, and changes the size of the predetermined range depending on the third shift amount (shift amount for acquiring the reconstructed image) and the fourth shift amounts (shift amount for calculating the evaluation value).

Preferably, the calculation unit is capable of calculating a first evaluation value calculated by using a first weighting coefficient (for example, 1) for all pixels in the predetermined range. In addition, the calculation unit is capable of calculating a second evaluation value calculated by using a second weighting coefficient (for example, 0.5) smaller than the first weighting coefficient for part of the pixels (for example, pixel at an end of the predetermined range) in the predetermined range. Then, the calculation unit determines, depending on the size of the predetermined range, either one of the first or second evaluation value to be calculated.

Preferably, the evaluation value is information (such as a correlation value) related to a degree of coincidence between the first and second image signals. Preferably, the evaluation value is information (such as a contrast evaluation value) related to a focusing degree of the first and second image signals. Preferably, the calculation unit performs three-point interpolation calculation based on the evaluation value to calculate the defocus amount.

According to each embodiment, an image pickup apparatus, a control apparatus, a control method, and a non-transitory computer-readable storage medium can be provided which are capable of calculating a defocus amount with high accuracy by using a method of three-point interpolation regardless of an object image when performing focus detection by a pupil-divided phase difference detection method.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-129161, filed on Jun. 24, 2014, which is hereby incorporated by reference wherein in its entirety.

What is claimed is:

1. An image pickup apparatus comprising:
   an image pickup unit configured to receive an incident light beam from regions of a pupil of an optical system different from each other to output a first image signal and a second image signal; and
   a calculation unit configured to calculate an evaluation value while relatively shifting the first and second image signals from pixels included in a predetermined range to calculate a defocus amount,
   wherein the calculation unit is configured to change a size of the predetermined range so that a center of a visual field range relative to a position of a target pixel does not vary depending on a shift amount between the first and second image signals.

2. The image pickup apparatus according to claim 1, wherein the center of the visual field range coincides with a center of the target pixel.

3. The image pickup apparatus according to claim 1, wherein the center of the visual field range is displaced by a half pixel from a center of the target pixel.

4. The image pickup apparatus according to claim 1, wherein the calculation unit is configured to:
   set the number of the pixels included in the predetermined range to an even number when the shift amount is a first shift amount, and set the number of the pixels included in the predetermined range to an odd number when the shift amount is a second shift amount.

5. The image pickup apparatus according to claim 1, further comprising an addition unit configured to add the first and second image signals.

6. The image pickup apparatus according to claim 5, wherein the addition unit is configured to add the first and second image signals shifted by a third shift amount from each other, and
wherein the calculation unit is configured to:
shift the first and second image signals by a fourth shift amount to calculate the evaluation value, and
change the size of the predetermined range depending on the third and fourth shift amounts.

7. The image pickup apparatus according to claim 1,
wherein the calculation unit is capable of calculating a first evaluation value calculated by using a first weighting coefficient for all pixels in the predetermined range and a second evaluation value calculated by using a second weighting coefficient smaller than the first weighting coefficient for part of the pixels in the predetermined range, and
wherein the calculation unit is configured to determine, depending on the size of the predetermined range, either one of the first or second evaluation value to be calculated.

8. The image pickup apparatus according to claim 1,
wherein the evaluation value is information related to a degree of coincidence between the first and second image signals.

9. The image pickup apparatus according to claim 1,
wherein the evaluation value is information related to a focusing degree of the first and second image signals.

10. The image pickup apparatus according to claim 1,
wherein the calculation unit performs three-point interpolation calculation based on the evaluation value to calculate the defocus amount.

11. A control apparatus comprising:
an input unit configured to input a first image signal and a second image signal output from an image pickup unit based on an incident light beam from regions of a pupil of an optical system different from each other; and
a calculation unit configured to calculate an evaluation value while relatively shifting the first and second image signals from pixels included in a predetermined range to calculate a defocus amount,
wherein the calculation unit is configured to change a size of the predetermined range so that a center of a visual field range relative to a position of a target pixel does not vary depending on a shift amount between the first and second image signals.

12. A control method comprising the steps of:
acquiring a first image signal and a second image signal output from an image pickup unit based on an incident light beam from regions of a pupil of an optical system different from each other; and
calculating an evaluation value while relatively shifting the first and second image signals from pixels included in a predetermined range to calculate a defocus amount,
wherein the step of calculating the evaluation value includes changing a size of the predetermined range so that a center of a visual field range relative to a position of a target pixel does not vary depending on a shift amount between the first and second image signals.

13. A non-transitory computer-readable storage medium which stores a program causing a computer to execute a process comprising the steps of:
acquiring a first image signal and a second image signal output from an image pickup unit based on an incident light beam from regions of a pupil of an optical system different from each other; and
calculating an evaluation value while relatively shifting the first and second image signals from pixels included in a predetermined range to calculate a defocus amount,
wherein the step of calculating the evaluation value includes changing a size of the predetermined range so that a center of a visual field range relative to a position of a target pixel does not vary depending on a shift amount between the first and second image signals.

* * * * *